US012739373B2

(12) United States Patent
Chiu et al.

(10) Patent No.: US 12,739,373 B2
(45) Date of Patent: Sep. 15, 2026

(54) METHOD AND APPARATUS FOR ADAPTIVE LOOP FILTER WITH NON-SAMPLE TAPS FOR VIDEO CODING

(71) Applicant: MEDIATEK INC., Hsinchu City (TW)

(72) Inventors: Shih-Chun Chiu, Hsinchu City (TW); Yu-Ling Hsiao, Hsinchu City (TW); Yu-Cheng Lin, Hsinchu City (TW); Chih-Wei Hsu, Hsinchu City (TW); Ching-Yeh Chen, Hsinchu City (TW); Tzu-Der Chuang, Hsinchu City (TW); Yi-Wen Chen, San Jose, CA (US); Yu-Wen Huang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 19/110,547

(22) PCT Filed: Aug. 30, 2023

(86) PCT No.: PCT/CN2023/115651
§ 371 (c)(1),
(2) Date: Mar. 11, 2025

(87) PCT Pub. No.: WO2024/055842
PCT Pub. Date: Mar. 21, 2024

(65) Prior Publication Data

US 2026/0095569 A1 Apr. 2, 2026

Related U.S. Application Data

(60) Provisional application No. 63/377,731, filed on Sep. 30, 2022, provisional application No. 63/375,882, filed on Sep. 16, 2022.

(51) Int. Cl.
*H04N 19/117* (2014.01)
*H04N 19/176* (2014.01)
*H04N 19/82* (2014.01)

(52) U.S. Cl.
CPC ......... *H04N 19/117* (2014.11); *H04N 19/176* (2014.11); *H04N 19/82* (2014.11)

(58) Field of Classification Search
None
See application file for complete search history.

(56) References Cited

U.S. PATENT DOCUMENTS

2013/0156097 A1 6/2013 Budagavi
2013/0266059 A1 10/2013 Chong
(Continued)

FOREIGN PATENT DOCUMENTS

CN 114640847 A 6/2022

OTHER PUBLICATIONS

International Search Report and Written Opinion dated Oct. 20, 2023, issued in application No. PCT/CN2023/115651.
(Continued)

*Primary Examiner* — Christopher Braniff
(74) *Attorney, Agent, or Firm* — McClure, Qualey & Rodack, LLP

(57) ABSTRACT

A method and apparatus for video coding using ALF with non-sample-value filter taps. According to the method, reconstructed pixels are received, wherein the reconstructed pixels comprise a current block. A current filtered output from an ALF for a current sample in the current block is derived, wherein the ALF comprises at least one non-sample-value term derived using target information unrelated to sample values of the current block and the target information is derived at an encoder side, or derived or received at a decoder side. Filtered-reconstructed pixels are provided, wherein the filtered-reconstructed pixels comprise the current filtered output.

20 Claims, 6 Drawing Sheets

(56) References Cited

U.S. PATENT DOCUMENTS

| | | | |
|---|---|---|---|
| 2015/0195533 | A1 | 7/2015 | Hsiang |
| 2020/0304838 | A1 | 9/2020 | Budagavi |
| 2022/0030234 | A1 | 1/2022 | Chen |
| 2022/0078415 | A1 | 3/2022 | Taquet |

OTHER PUBLICATIONS

Chen, C.Y., et al.; "CE5-1: Adaptive loop filter with virtual boundary processing;" Joint Video Experts Team (JVET) of ITU-T SG 16 WP 3 and ISO/IEC JTC 1/SC 29/WG 11; Mar. 2019; pp. 1-8.

Extended European Search Report dated Jun. 17, 2026, issued in application No. EP 23864574.1.

Karczewicz, M., et al.; "VVC In-Loop Filters;" IEEE Transactions on Circuits and Systems for Video Technology; vol. 31; No. 10; Oct. 2021; pp. 3907-3925.

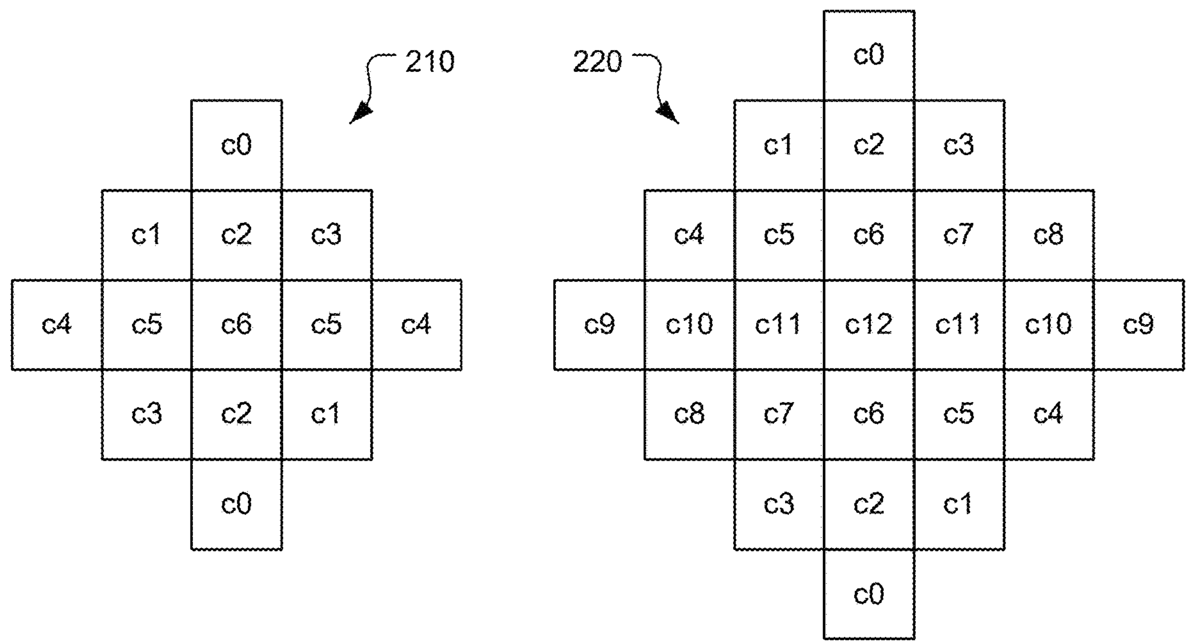
*Fig. 2*
*Fig. 3A*
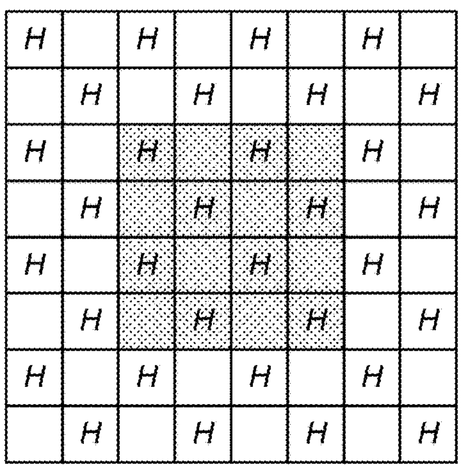
*Fig. 3B*

| D1 | | D1 | | D1 | | D1 | |
|---|---|---|---|---|---|---|---|
| | D1 | | D1 | | D1 | | D1 |
| D1 | | D1 | | D1 | | D1 | |
| | D1 | | D1 | | D1 | | D1 |
| D1 | | D1 | | D1 | | D1 | |
| | D1 | | D1 | | D1 | | D1 |
| D1 | | D1 | | D1 | | D1 | |
| | D1 | | D1 | | D1 | | D1 |

| D2 | | D2 | | D2 | | D2 | |
|---|---|---|---|---|---|---|---|
| | D2 | | D2 | | D2 | | D2 |
| D2 | | D2 | | D2 | | D2 | |
| | D2 | | D2 | | D2 | | D2 |
| D2 | | D2 | | D2 | | D2 | |
| | D2 | | D2 | | D2 | | D2 |
| D2 | | D2 | | D2 | | D2 | |
| | D2 | | D2 | | D2 | | D2 |

METHOD AND APPARATUS FOR ADAPTIVE LOOP FILTER WITH NON-SAMPLE TAPS FOR VIDEO CODING

CROSS REFERENCE TO RELATED APPLICATIONS

The present invention is a non-Provisional Application of and claims priority to U.S. Provisional Patent Application No. 63/375,882, filed on Sep. 16, 2022 and U.S. Provisional Patent Application No. 63/377,731, filed on Sep. 30, 2022. The U.S. Provisional Patent Applications are hereby incorporated by reference in their entireties.

FIELD OF THE INVENTION

The present invention relates to video coding system using ALF (Adaptive Loop Filter). In particular, the present invention relates to the ALF using non-sample taps.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based on the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

Adaptive Loop Filter in VVC

In VVC, an Adaptive Loop Filter (ALF) with block-based filter adaption is applied. For the luma component, one filter is selected among 25 filters for each 4×4 block, based on the direction and activity of local gradients.

Filter Shape

Two diamond filter shapes (as shown in FIG. 2) are used. The 7×7 diamond shape 220 is applied for luma component and the 5×5 diamond shape 210 is applied for chroma components.

Block Classification

For luma component, each 4×4 block is categorized into one out of 25 classes. The classification index C is derived based on its directionality D and a quantized value of activity $\hat{A}$, as follows:

$$C = 5D + \hat{A}.$$

To calculate D and Â, gradients of the horizontal, vertical and two diagonal direction are first calculated using 1-D Laplacian:

$$g_v = \sum_{k=i-2}^{i+3} \sum_{l=j-2}^{j+3} V_{k,l},\ V_{k,l} = |2R(k, l) - R(k, l-1) - R(k, l+1)|,$$

$$g_h = \sum_{k=i-2}^{i+3} \sum_{l=j-2}^{j+3} H_{k,l},\ H_{k,l} = |2R(k, l) - R(k-1, l) - R(k+1, l)|,$$

$$g_{d1} = \sum_{k=i-2}^{i+3} \sum_{l=j-2}^{j+3} D1_{k,l},\ D1_{k,l} = |2R(k, l) - R(k-1, l-1) - R(k+1, l+1)|,$$

$$g_{d2} = \sum_{k=i-2}^{i+3} \sum_{l=j-2}^{j+3} D2_{k,l},\ D2_{k,l} = |2R(k, l) - R(k-1, l+1) - R(k+1, l-1)|,$$

where indices i and j refer to the coordinates of the upper left sample within the 4×4 block and R(i,j) indicates a reconstructed sample at coordinate (i,j).

To reduce the complexity of block classification, the subsampled 1-D Laplacian calculation is applied to the vertical direction (FIG. 3A) and the horizontal direction (FIG. 3B). As shown in FIGS. 3C-D, the same subsampled positions are used for gradient calculation of all directions ($g_{d1}$ in FIG. 3C and $g_{d2}$ in FIG. 3D).

Then D maximum and minimum values of the gradients of horizontal and vertical directions are set as:

$$g_{h,v}^{max} = \max(g_h, g_v),\ g_{h,v}^{min} = \min(g_h, g_v).$$

The maximum and minimum values of the gradient of two diagonal directions are set as:

$$g_{d0,d1}^{max} = \max(g_{d0}, g_{d1}),\ g_{d0,d1}^{min} = \min(g_{d0}, g_{d1}).$$

To derive the value of the directionality D, these values are compared against each other and with two thresholds $t_1$ and $t_2$:

Step 1. If both $$g_{h,v}^{max} \le t_1 \cdot g_{h,v}^{min} \text{ and } g_{d0,d1}^{max} \le t_1 \cdot g_{d0,d1}^{min}$$

are true. D is set to 0.

Step 2. If $$g_{h,v}^{max} / g_{h,v}^{min} > g_{d0,d1}^{max} / g_{d0,d1}^{min},$$

continue from Step 3; otherwise continue from Step 4.

Step 3. If $$g_{h,v}^{max} > t_2 \cdot g_{h,v}^{min},$$

otherwise D is set to 1.

Step 4. If $$g_{d0,d1}^{max} > t_2 \cdot g_{d0,d1}^{min},$$

D is set to 4; otherwise D is set to 3.

The activity value A is calculated as:

$$A = \sum_{k=i-2}^{i+3} \sum_{l=j-2}^{j+3} (V_{k,l} + H_{k,l}).$$

A is further quantized to the range of 0 to 4, inclusively, and the quantized value is denoted as Â.

For chroma components in a picture, no classification is applied.

Geometric Transformations of Filter Coefficients and Clipping Values

Before filtering each 4×4 luma block, geometric transformations such as rotation or diagonal and vertical flipping are applied to the filter coefficients f(k, l) and to the corresponding filter clipping values c(k, l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

$$\text{Diagonal: } f_D(k, l) = f(l, k),\ c_D(k, l) = c(l, k),$$

$$\text{Vertical flip: } f_V(k, l) = f(k, K-l-1),\ c_V(k, l) = c(k, K-l-1),$$

$$\text{Rotation: } f_R(k, l) = f(K-l-1, k),\ c_R(k, l) = c(K-l-1, k),$$

where K is the size of the filter and 0≤k, l≤K−1 are coefficients coordinates, such that location (0,0) is at the upper left corner and location (K−1, K−1) is at the lower right corner. The transformations are applied to the filter coefficients f(k, l) and to the clipping values c(k, l) depending on gradient values calculated for that block. The relationship between the transformation and the four gradients of the four directions are summarized in the following table.

TABLE 1

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

Filtering Process

At decoder side, when ALF is enabled for a CTB, each sample R(i,j) within the CU is filtered, resulting in sample value R'(i, j) as shown below, $$R'(i, j) = R(i, j) + \left(\left(\sum_{k \ne 0} \sum_{l \ne 0} f(k, l) \times K(R(i+k, j+l) - R(i, j), c(k, l)) + 64\right) >> 7.\right)$$

where f(k, l) denotes the decoded filter coefficients, K(x, y) is the clipping function and c(k, l) denotes the decoded clipping parameters. The variable k and l varies between −L/2 and L/2, where L denotes the filter length. The clipping function K(x, y)=min(y, max(−y, x)) which corresponds to the function Clip3 (−y, y, x). The clipping operation introduces non-linearity to make ALF more efficient by reducing the impact of neighbour sample values that are too different with the current sample value.

Cross Component Adaptive Loop Filter

CC-ALF uses luma sample values to refine each chroma component by applying an adaptive, linear filter to the luma channel and then using the output of this filtering operation for chroma refinement. FIG. 4A provides a system level diagram of the CC-ALF process with respect to the SAO, luma ALF and chroma ALF processes. As shown in FIG. 4A, each colour component (i.e., Y, Cb and Cr) is processed by its respective SAO (i.e., SAO Luma 410, SAO Cb 412 and SAO Cr 414). After SAO, ALF Luma 420 is applied to the SAO-processed luma and ALF Chroma 430 is applied to SAO-processed Cb and Cr. However, there is a cross-component term from luma to a chroma component (i.e., CC-ALF Cb 422 and CC-ALF Cr 424). The outputs from the cross-component ALF are added (using adders 432 and 434 respectively) to the outputs from ALF Chroma 430.

Filtering in CC-ALF is accomplished by applying a linear, diamond shaped filter (e.g. filters 440 and 442 in FIG. 4B) to the luma channel. In FIG. 4B, a blank circle indicates a luma sample and a dot-filled circle indicate a chroma sample. One filter is used for each chroma channel, and the operation is expressed as:

$$\Delta I_i(x, y) = \sum_{(x_0,y_0)\in S_i} I_0(x_Y + x_0, y_Y + y_0)c_i(x_0, y_0)$$

where (x, y) is chroma component i location being refined, $(x_y, y_y)$ is the luma location based on (x, y), $S_i$ is filter support area in luma component, and $c_i(x_0, y_0)$ represents the filter coefficients.

As shown in FIG. 4B, the luma filter support is the region collocated with the current chroma sample after accounting for the spatial scaling factor between the luma and chroma planes.

In the VVC reference software, CC-ALF filter coefficients are computed by minimizing the mean square error of each chroma channel with respect to the original chroma content. To achieve this, the VTM (VVC Test Model) algorithm uses a coefficient derivation process similar to the one used for chroma ALF. Specifically, a correlation matrix is derived, and the coefficients are computed using a Cholesky decomposition solver in an attempt to minimize a mean square error metric. In designing the filters, a maximum of 8 CC-ALF filters can be designed and transmitted per picture. The resulting filters are then indicated for each of the two chroma channels on a CTU basis.

Additional characteristics of CC-ALF include:

- The design uses a 3×4 diamond shape with 8 taps.
- Seven filter coefficients are transmitted in the APS.
- Each of the transmitted coefficients has a 6-bit dynamic range and is restricted to power-of-2 values.
- The eighth filter coefficient is derived at the decoder such that the sum of the filter coefficients is equal to 0.
- An APS may be referenced in the slice header.
- CC-ALF filter selection is controlled at CTU-level for each chroma component.
- Boundary padding for the horizontal virtual boundaries uses the same memory access pattern as luma ALF.

As an additional feature, the reference encoder can be configured to enable some basic subjective tuning through the configuration file. When enabled, the VTM attenuates the application of CC-ALF in regions that are coded with high QP and are either near mid-grey or contain a large amount of luma high frequencies. Algorithmically, this is accomplished by disabling the application of CC-ALF in CTUs where any of the following conditions are true:

- The slice QP value minus 1 is less than or equal to the base QP value.
- The number of chroma samples for which the local contrast is greater than (1<<(bitDepth−2))−1 exceeds the CTU height, where the local contrast is the difference between the maximum and minimum luma sample values within the filter support region.
- More than a quarter of chroma samples are in the range between (1<<(bitDepth−1))−16 and (1<<(bitDepth−1))+16

The motivation for this functionality is to provide some assurance that CC-ALF does not amplify artefacts introduced earlier in the decoding path (This is largely due the fact that the VTM currently does not explicitly optimize for chroma subjective quality). It is anticipated that alternative encoder implementations may either not use this functionality or incorporate alternative strategies suitable for their encoding characteristics.

Filter Parameters Signalling

ALF filter parameters are signalled in Adaptation Parameter Set (APS). In one APS, up to 25 sets of luma filter coefficients and clipping value indexes, and up to eight sets of chroma filter coefficients and clipping value indexes could be signalled. To reduce bits overhead, filter coefficients of different classification for luma component can be merged. In slice header, the indices of the APSs used for the current slice are signalled.

Clipping value indexes, which are decoded from the APS, allow determining clipping values using a table of clipping values for both luma and Chroma components. These clipping values are dependent of the internal bitdepth. More precisely, the clipping values are obtained by the following formula:

$$AlfClip = \{\text{round}(2^{B-\alpha*n}) \text{ for } n \in [0..N-1]\}$$

with B equal to the internal bitdepth, a is a pre-defined constant value equal to 2.35, and N equal to 4 which is the number of allowed clipping values in VVC. The AlfClip is then rounded to the nearest value with the format of power of 2.

In slice header, up to 7 APS indices can be signalled to specify the luma filter sets that are used for the current slice. The filtering process can be further controlled at CTB level. A flag is always signalled to indicate whether ALF is applied to a luma CTB. A luma CTB can choose a filter set among 16 fixed filter sets and the filter sets from APSs. A filter set index is signalled for a luma CTB to indicate which filter set is applied. The 16 fixed filter sets are pre-defined and hard-coded in both the encoder and the decoder.

For the chroma component, an APS index is signalled in slice header to indicate the chroma filter sets being used for the current slice. At CTB level, a filter index is signalled for each chroma CTB if there is more than one chroma filter set in the APS.

The filter coefficients are quantized with norm equal to 128. In order to restrict the multiplication complexity, a bitstream conformance is applied so that the coefficient value of the non-central position shall be in the range of $-2^7$ to $2^7-1$, inclusive. The central position coefficient is not signalled in the bitstream and is considered as equal to 128.

Adaptive Loop Filter in ECM

ALF Simplification

ALF gradient subsampling and ALF virtual boundary processing are removed. Block size for classification is reduced from 4×4 to 2×2. Filter size for both luma and chroma, for which ALF coefficients are signalled, is increased to 9×9.

ALF with Fixed Filters

To filter a luma sample, three different classifiers ($C_0$, $C_1$ and $C_2$) and three different sets of filters ($F_0$, $F_1$ and $F_2$) are used. Sets $F_0$ and $F_1$ contain fixed filters, with coefficients trained for classifiers $C_0$ and $C_1$. Coefficients of filters in $F_2$ are signalled. Which filter from a set $F_i$ is used for a given sample is decided by a class $C_i$ assigned to this sample using classifier $C_i$.

Filtering

At first, two 13×13 diamond shape fixed filters $F_0$ and $F_1$ are applied to derive two intermediate samples $R_0(x, y)$ and $R_1(x, y)$. After that, $F_2$ is applied to $R_0(x, y)$, $R_1(x, y)$, and neighbouring samples to derive a filtered sample as $$\tilde{R}(x, y) = R(x, y) + \left[\sum_{i=0}^{19} c_i(f_{i,0} + f_{i,1})\right] + \left[\sum_{i=20}^{21} c_i g_i\right],$$

where $f_{i,j}$ is the clipped difference between a neighbouring sample and current sample $R(x, y)$ and $g_i$ is the clipped difference between $R_{i-20}(x, y)$ and current sample. The filter coefficients $c_i$, i=0, . . . 21, are signalled.

Classification

Based on directionality $D_i$ and activity $\hat{A}_i$, a class $C_i$ is assigned to each 2×2 block:

$$C_i = \hat{A}_i * M_{D,i} + D_i,$$

where $M_{D,i}$ represents the total number of directionalities $D_i$.

As in VVC, values of the horizontal, vertical, and two diagonal gradients are calculated for each sample using 1-D Laplacian. The sum of the sample gradients within a 4×4 window that covers the target 2×2 block is used for classifier $C_0$ and the sum of sample gradients within a 12×12 window is used for classifiers $C_1$ and $C_2$. The sums of horizontal, vertical and two diagonal gradients are denoted, respectively, as $$g_h^i,\ g_v^i,\ g_{d1}^i \text{ and } g_{d2}^i.$$

The directionality $D_i$ is determined by comparing $$r_{h,v}^i = \frac{\max(g_h^i, g_v^i)}{\min(g_h^i, g_v^i)},\ r_{d1,d2}^i = \frac{\max(g_{d1}^i, g_{d2}^i)}{\min(g_{d1}^i, g_{d2}^i)},$$

with a set of thresholds. The directionality $D_2$ is derived as in VVC using thresholds 2 and 4.5. For $D_0$ and $D_1$, horizontal/vertical edge strength $$E_{HV}^i$$

and diagonal edge strength $$E_D^i$$

are calculated first. Thresholds Th=[1.25, 1.5, 2, 3, 4.5, 8] are used. Edge strength $$E_{HV}^i$$

is 0 if $$r_{h,v}^i \le Th[0];$$

otherwise, $$E_{HV}^i$$

is the maximum integer such that $$r_{h,v}^i > Th[E_{HV}^i - 1].$$

Edge strength $$E_D^i$$

is 0 if $$r_{d1,d2}^i \le Th[0];$$

otherwise, $$E_D^i$$

is the maximum integer such that $$r_{d1,d2}^i > Th[E_D^i - 1].$$

When $$r_{h,v}^i > r_{d1,d2}^i,$$

i.e., horizontal/vertical edges are dominant, the $D_i$ is derived by using Table 2A; otherwise, diagonal edges are dominant, the $D_i$ is derived by using Table 2B.

TABLE 2A

Mapping of $E_D^i$ and $E_{HV}^i$ to $D_i$

| $E_{HV}^i$ | $E_D^i$ 0 | 1 | 2 | 3 | 4 | 5 | 6 |
|---|---|---|---|---|---|---|---|
| 0 | 0 | 0 | 0 | 0 | 0 | 0 | 0 |
| 1 | 1 | 2 | 0 | 0 | 0 | 0 | 0 |
| 2 | 3 | 4 | 5 | 0 | 0 | 0 | 0 |
| 3 | 6 | 7 | 8 | 9 | 0 | 0 | 0 |
| 4 | 10 | 11 | 12 | 13 | 14 | 0 | 0 |
| 5 | 15 | 16 | 17 | 18 | 19 | 20 | 0 |
| 6 | 21 | 22 | 23 | 24 | 25 | 26 | 27 |

TABLE 2B

Mapping of $E_D^i$ and $E_{HV}^i$ to $D_i$

| $E_D^i$ | $E_{HV}^i$ 0 | 1 | 2 | 3 | 4 | 5 | 6 |
|---|---|---|---|---|---|---|---|
| 0 | 28 | 0 | 0 | 0 | 0 | 0 | 0 |
| 1 | 29 | 30 | 0 | 0 | 0 | 0 | 0 |
| 2 | 31 | 32 | 33 | 0 | 0 | 0 | 0 |
| 3 | 34 | 35 | 36 | 37 | 0 | 0 | 0 |
| 4 | 38 | 39 | 40 | 41 | 42 | 0 | 0 |
| 5 | 43 | 44 | 45 | 46 | 47 | 48 | 0 |
| 6 | 49 | 50 | 51 | 52 | 53 | 54 | 55 |

To obtain $\hat{A}_i$, the sum of vertical and horizontal gradients $A_i$ is mapped to the range of 0 to n, where n is equal to 4 for $\hat{A}_2$ and 15 for $\hat{A}_0$ and $\hat{A}_1$.

In an ALF_APS, up to 4 luma filter sets are signalled, each set may have up to 25 filters.

In the present invention, Adaptive Loop Filter (ALF) with a new type of input corresponding to non-sample values is disclosed to improve the performance for ALF.

BRIEF SUMMARY OF THE INVENTION

A method and apparatus for video coding using ALF (Adaptive Loop Filter) are disclosed. According to the method, reconstructed pixels are received, wherein the reconstructed pixels comprise a current block. A current filtered output from an ALF for a current sample in the current block is derived, wherein the ALF comprises at least one non-sample-value term derived using target information unrelated to sample values of the current block and the target information is derived at an encoder side, or derived or received at a decoder side. Filtered-reconstructed pixels are provided, wherein the filtered-reconstructed pixels comprise the current filtered output.

In one embodiment, said at least one non-sample-value term based on the target information is derived as a sum of one or more non-sample-value filter taps unrelated to sample values of the current block. In one embodiment, each of said one or more non-sample-value filter taps corresponds to a target function of the target information.

In one embodiment, the target function corresponds to a positional function taking positional information of one or more current samples of the current block as an input. In one embodiment, the positional function corresponds to a periodical function of one or more positions associated with one or more current samples. In one embodiment, the periodical function of one or more positions corresponds to a sinusoidal function, a square-wave function, a triangle-wave function, or a sawtooth-wave function.

In one embodiment, the target function corresponds to a binary function of the target information, wherein the binary function outputs a first value if the target information satisfies a condition and the binary function outputs a second value if the target information does not satisfy the condition. In one embodiment, the first value corresponds to a predefined offset or the first value is selected according to a clipped value index associated with the current block. In one embodiment, the second value corresponds to 0.

In one embodiment, the target information corresponds to positional information of one or more current samples of the current block as an input. In one embodiment, the condition is determined according to a position or one or more derivative positions of a target sample with respect to a repetitive pattern in a horizontal direction, vertical direction or both.

In one embodiment, the target information corresponds to CU-coded information. In one embodiment, the CU-coded information comprises CU mode, prediction mode, CU boundary, CU residual, MV information, or a combination thereof. In one embodiment, the condition is determined by comparing a horizontal component, a vertical component or both of a motion vector of the current block with one or more thresholds. In another embodiment, the condition is determined based on proximity of a target sample with respect to a boundary of the current block. In yet another embodiment, wherein the condition is determined based on prediction direction of a target sample of the current block.

In one embodiment, the target information corresponds to picture information. In one embodiment, the picture information comprises POC (Picture Order Count), temporal ID, layer ID, or a combination thereof.

In one embodiment, the target information corresponds to ALF classification information. In one embodiment, the ALF classification information comprises transpose index, activity, directionality, quantized activity, quantized directionality, or a combination thereof derived from ALF classifier. In another embodiment, the condition is determined based on a transpose index of the current block. In yet another embodiment, the condition is determined based on quantized activity of the current block.

In one embodiment, the target information corresponds to joint correlation calculated from luma and chroma samples.

BRIEF DESCRIPTION OF THE DRAWINGS

FIG. 2 illustrates the ALF filter shapes for the chroma (left) and luma (right) components.

FIGS. 3A-D illustrates the subsampled Laplacian calculations for $g_v$ (3A), $g_h$ (3B), $g_{d1}$ (3C) and $g_{d2}$ (3D).

FIG. 4A illustrates the placement of CC-ALF with respect to other loop filters.

DETAILED DESCRIPTION OF THE INVENTION

Figure 1A:
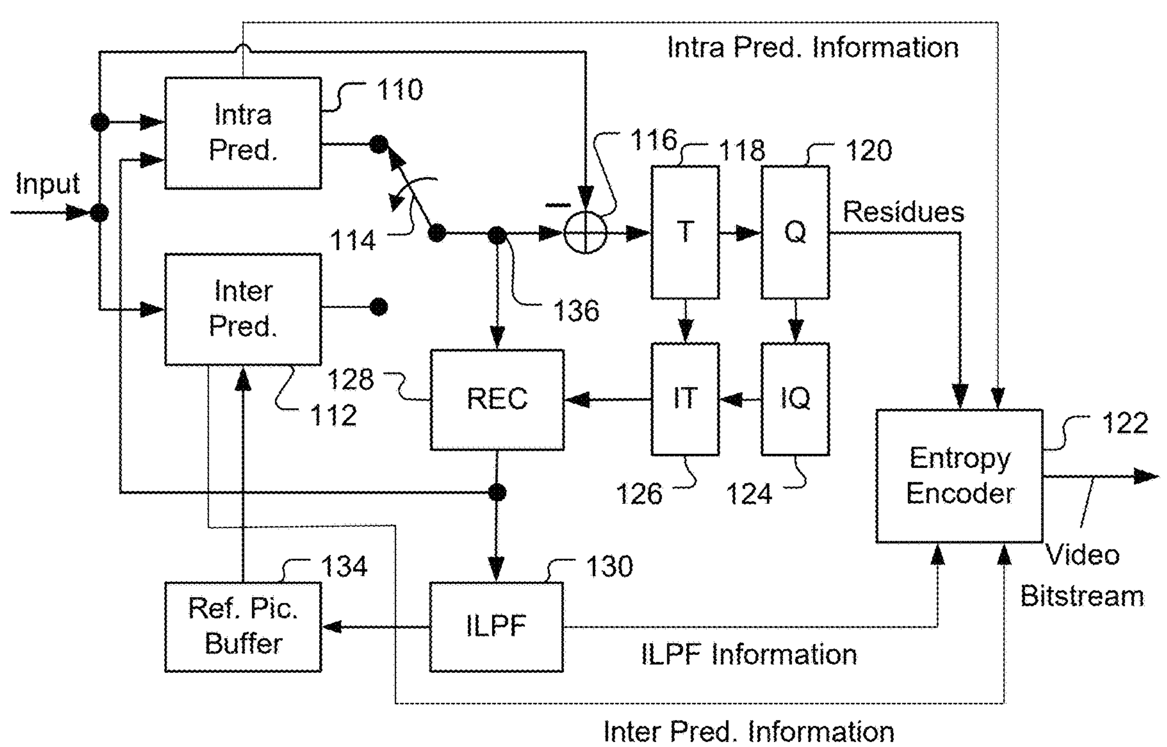
FIG. 1A illustrates an exemplary adaptive Inter/Intra video coding system incorporating loop processing.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In the following, new types of inputs are disclosed for ALF. In the conventional ALF, the filtering operations are applied to signals related to sample values (e.g. the current sample value, neighbouring sample values, or differences between two sample values, etc.). The new types of inputs are derived using information not related to the sample values.

ALF with Non-Sample-Value Taps

In general, ALF reconstruction process can be represented by $$\tilde{R}(x, y) = R(x, y) + \left[\sum_{i=0}^{K-1} c_i n_i\right],$$

where R(x, y) is the sample value before ALF filtering, R(x, y) is the sample value after ALF filtering, $c_i$ is the i-th filter coefficient, and $n_i$ is the i-th filter tap input. Specifically, $n_i$ can be a clipped neighbouring difference value, a correction value from another filter, or a correction value from anther in-loop filtering stage. In this disclosure, several additional tap generation methods related to information other than sample values are illustrated to increase the capability and adaptivity of ALF filters.

According to one embodiment of the present invention, the reconstruction equation for ALF is modified as follows:

$$\tilde{R}(x, y) = R(x, y) + \left[\sum_{i=0}^{K-1} c_i n_i\right] + \left[\sum_{j=0}^{M-1} c_{K+j} f_j(x, y)\right],$$

where $f_j$ is a function related to information other than sample values at (x, y) and M is the total number of additional taps.

In one embodiment, $f_j$ is a functions related to the transpose index (the index used to determine how to perform geometric transform) at (x, y). For example:

$$f_0(x, y) = (transposeIndex == 0)?\ C{:}0,$$

$$f_1(x, y) = (transposeIndex == 1)?\ C{:}0,$$

$$f_2(x, y) = (transposeIndex == 2)?\ C{:}0,$$

$$f_3(x, y) = (transposeIndex == 3)?\ C{:}0,$$

where C is a pre-defined offset value or a value selected by clipping index. In the above, the expression "x?y:z" will output y or z depending on x. If x is true (e.g. x equal to 1), y is outputted; otherwise z is outputted. In other words, "x" may be considered as a test condition and the output is dependent on the condition.

In another embodiment, $f_j$ is a function related to the activity values calculated for gradient classifier at (x, y). For example, $$f_0(x, y) = (\hat{A} == 0)?C{:}0,$$

$$f_1(x, y) = (\hat{A} == 1)?C{:}0,$$

$$f_2(x, y) = (\hat{A} == 2)?C{:}0,$$

$$f_3(x, y) = (\hat{A} == 3)?C{:}0,$$

$$f_4(x, y) = (\hat{A} == 4)?C{:}0,$$

where Â is the quantized activity value at (x, y) and C is a pre-defined offset value or a value selected by clipping index.

For another example, $$f_0(x, y) = A,$$

where A is the activity value at (x, y). In this example, activity value is directly used as the source and the clipping can be applied to it just as other taps.

In the above embodiment, activity value A (or the quantized value Â) can be replaced with directionality D (or the quantized value D̂) calculated for gradient classifier at (x, y).

In another embodiment, $f_j$ is function related to the sample value mean in the block calculated for band classifier at (x, y). For example, $$f_0(x, y) = (M\%4 == 0)\ ?\ C{:}\ 0,$$

$$f_1(x, y) = (M\%4 == 1)\ ?\ C{:}\ 0$$

-continued $$f_2(x, y) = (M\%4 == 2)\ ?\ C: 0$$

$$f_3(x, y) = (M\%4 == 3)\ ?\ C: 0,$$

where M %4 is taking the 2 LSBs of the sample value mean in the current block and C is a pre-defined offset value or a value selected by clipping index.

ALF with Positional Taps

In general, ALF reconstruction process can be represented by $$\tilde{R}(x, y) = R(x, y) + \left[\sum_{i=0}^{K-1} c_i n_i\right],$$

where R(x, y) is the sample value before ALF filtering, R(x, y) is the sample value after ALF filtering, $c_i$ is the i-th filter coefficient, and $n_i$ is the i-th filter tap input. Specifically, $n_i$ can be a clipped neighbouring difference value, a correction value from another filter, or a correction value from anther in-loop filtering stage. In this proposal, several additional tap generation methods related to sample position are illustrated to increase the capability and adaptivity of ALF filters.

Specifically, the sample position (x, y) is modelled with periodic functions and added to the ALF reconstruction equation as additional taps:

$$\tilde{R}(x, y) = R(x, y) + \left[\sum_{i=0}^{K-1} c_i n_i\right] + \left[\sum_{j=0}^{M-1} c_{K+j} f_j(x, y)\right],$$

where $f_j$ is a periodic function and M is the total number of positional taps.

In one embodiment, two positional taps are introduced in ALF (M=2), where the periodic functions $f_j$ is sinusoidal functions as follows:

$$f_0(x, y) = \sin\left(\frac{2\pi x}{P_0}\right),$$

$$f_1(x, y) = \sin\left(\frac{2\pi y}{P_1}\right),$$

where $P_0$ and $P_1$ are the periods of the functions and they are selected according to the clipping indices. For example, if the clipping index of the corresponding coefficient $c_{K+0}$ is 0/1/2/3, period $P_0$ will be 32/16/8/4 respectively.

In another embodiment, four positional taps are included in ALF (M=4), where the periodic functions $f_j$ is a sinusoidal functions as follows.

$$f_0(x, y) = \sin\left(\frac{2\pi x}{P_0}\right),\ f_1(x, y) = \cos\left(\frac{2\pi x}{P_1}\right),$$

$$f_2(x, y) = \sin\left(\frac{2\pi y}{P_2}\right),\ f_3(x, y) = \cos\left(\frac{2\pi y}{P_3}\right),$$

where $P_0$, $P_1$, $P_2$, and $P_3$ are the periods of the functions and they are selected according to the clipping indices. Since there is a phase shift between sine and cosine functions, with the combination of the two functions, more types of refinement can be made.

In the above embodiments, an amplitude term A can be included in each periodic function. For example, instead of $\sin(2\pi x/P_0)$, $A*\sin(2\pi x/P_0)$ is used, where A can a pre-defined value or vary with the clipping index.

Figures 5A, 5B, 5C, 5D:
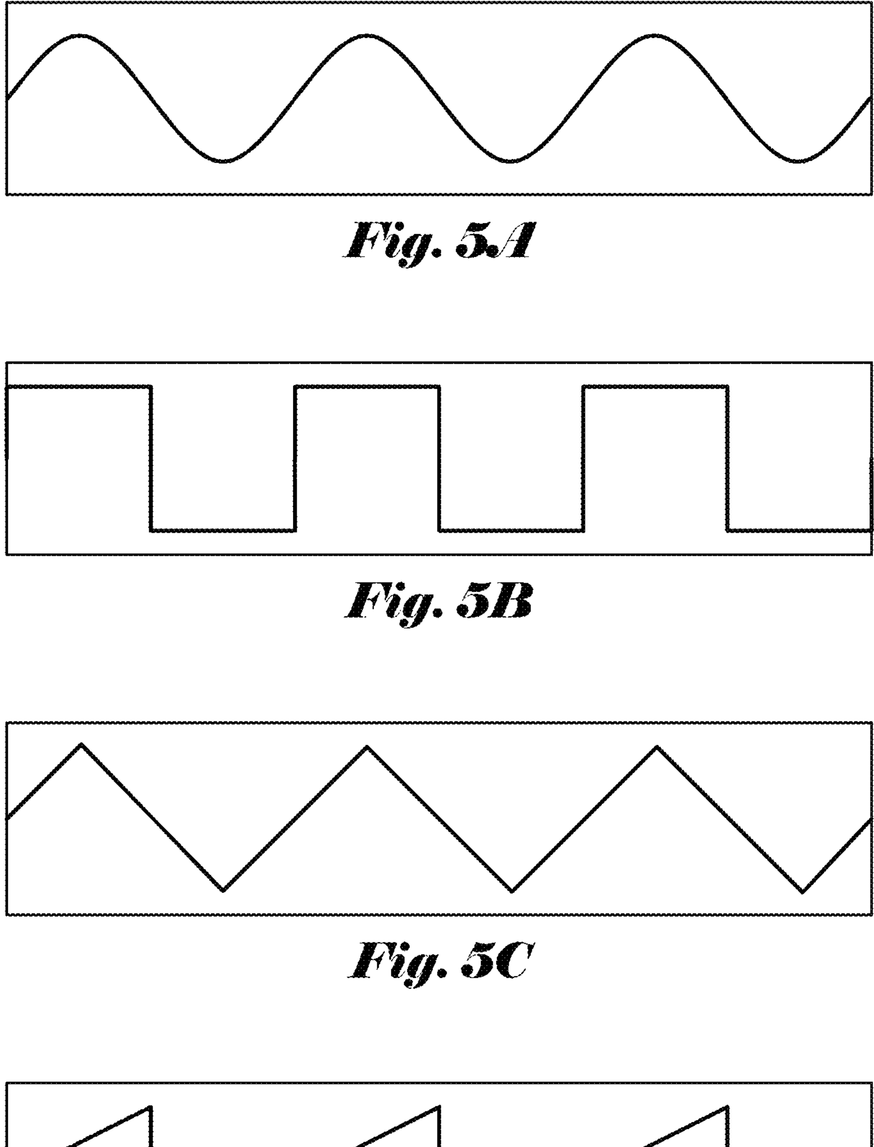
FIGS. 5A-D shows various periodical functions used to derive ALF tap signal: (A) sinusoidal wave, (B) square wave, (C) triangle wave and (D) sawtooth wave.

In the above embodiments, the sinusoidal functions can be replaced by other non-sinusoidal periodic functions shown in FIG. 5A-FIG. 5D, wherein a sinusoidal function is shown in FIG. 5A, a square wave is shown in FIG. 5B, a triangular wave is shown in FIG. 5C and a sawtooth wave is shown in FIG. 5D.

In another embodiment, periodic functions such as $f_j(x, y)=\sin(2\pi(a_j x+b_j y)/P_0)$ are used to make position x and y jointly embedded, where $(a_j, b_j)$ is a pre-determined integer pair.

In another embodiment, binary functions are used as source to generate additional taps. The following shows some examples.

Example 1

$$f_0(x, y) = (x \bmod 2 == 0)\ ?\ 1: 0,$$

$$f_1(x, y) = (x \bmod 2 == 1)\ ?\ 1: 0,$$

$$f_2(x, y) = (y \bmod 2 == 0)\ ?\ 1: 0,$$

$$f_3(x, y) = (y \bmod 2 == 1)\ ?\ 1: 0.$$

In example 1, x represents the horizontal position of a sample and y represents the vertical position of the sample. The condition of "(x mod 2==0)" corresponds to x is divisible by 2. On the other hand, the condition of "(x mod 2==1)" corresponds to remainder of 1 when x is divided by 2. Instead of "mod 2", other values (e.g. 4, or 8) may be used for the test condition. The test condition for "mod n" is equivalent to check the position of x with respect to a repetitive pattern (e.g., 2, 4, 6, 8, etc. for n=2). Similar situations also apply for the y. While the position (i.e., x, y or (x, y)) of a target sample is checked as a test condition in example 1, other positional information (referred as derivative positions in this disclosure) based on the position can also be used for the test condition. Some examples using one or more derivative positions are shown in examples 2 and 3.

Example 2

$$f_0(x, y) = ((x + y) \bmod 2 == 0)\ ?\ 1: 0,$$

$$f_1(x, y) = ((x + y) \bmod 2 == 1)\ ?\ 1: 0,$$

$$f_2(x, y) = (|x - y|) \bmod 2 == 0)\ ?\ 1: 0,$$

$$f_3(x, y) = (|x - y|) \bmod 2 == 1)\ ?\ 1: 0.$$

Example 3

$$f_0(x, y) = ((ax + y) \bmod 2 == 0)\ ?\ 1: 0,$$

$$f_1(x, y) = ((ax + y) \bmod 2 == 1)\ ?\ 1: 0,$$

-continued $$f_2(x, y) = (|x - ay| \bmod 2 == 0)\ ?\ 1:0,$$

$$f_3(x, y) = (|x - ay| \bmod 2 == 1)\ ?\ 1:0,$$

where a is slope, which can be a fixed pre-determined value or varied with clipping index selection.

Example 4

$$f_0(x, y) = (x \bmod 2 == 0\ \&\&\ y \bmod 2 == 0)\ ?\ 1:0,$$

$$f_1(x, y) = (x \bmod 2 == 1\ \&\&\ y \bmod 2 == 0)\ ?\ 1:0,$$

$$f_2(x, y) = (x \bmod 2 == 0\ \&\&\ y \bmod 2 == 1)\ ?\ 1:0,$$

$$f_3(x, y) = (x \bmod 2 == 1\ \&\&\ y \bmod 2 == 1)\ ?\ 1:0.$$

In example 4 above, the position is checked for both the horizontal direction and the vertical direction.

In the above method, the number of "2" in "mod 2" is an example that the pattern is repeated in a 2×2 block pattern. The number of "2" can be replaced by other number if the repetitive pattern is larger, such as M×N pattern where M and N is non-zero integer. The shape of the repetitive pattern can be square block or non-square block.

Example 5

$$f_0(x, y) = ((x, y) \text{ is near a } CU \text{ boundary})\ ?\ 1:0.$$

In example 5, the proximity of a target sample to the CU boundary is checked. The proximity can be measured by a distance to the CU boundary.

Example 6

$$f_0(x, y) = (\text{Residual at } (x, y) \text{ is smaller than a threshold } T)\ ?\ 1:0,$$

where threshold T is a fixed pre-determined value or varied with clipping index selection. Note that it can also use multiple taps to cover more different T values.

Example 7

$$f_0(x, y) = (Mvx \text{ at } (x, y) \text{ is smaller than a threshold } T)\ ?\ 1:0,$$

$$f_1(x, y) = (Mvy \text{ at } (x, y) \text{ is smaller than a threshold } T)\ ?\ 1:0,$$

$$f_2(x, y) = (Mvx \text{ at } (x, y) \text{ is larger than a threshold } T)\ ?\ 1:0,$$

$$f_3(x, y) = (Mvy \text{ at } (x, y) \text{ is larger than a threshold } T)\ ?\ 1:0,$$

where threshold T is a fixed pre-determined value or varied with clipping index selection, and Mvx and Mvy correspond to the horizontal component and the vertical component of the motion vector of the current block. Note that it can also use multiple taps to cover more different T values.

Example 8

$$f_0(x, y) = (\text{inter } dir \text{ at } (x, y) \text{ is } Bi)\ ?\ 1:0,$$

$$f_1(x, y) = (\text{inter } dir \text{ at } (x, y) \text{ is } L0)\ ?\ 1:0,$$

$$f_2(x, y) = (\text{inter } dir \text{ at } (x, y) \text{ is } L1)\ ?\ 1:0.$$

In example 8, the inter prediction direction is checked (i.e., Bi, L0 or 11) as the test condition.

Various coded information other than the sample intensity can also be used as the filter input according to embodiments of the present invention. The coded information can be derived or received at the decoder. For example, sample position, value derived from sample position, CU mode, prediction mode, CU boundary, residual, MV information, chroma sampling position/phase, ALF/in-loop filter/post-filter information, sample clip value, POC (Picture Order Count), temporal ID, layer ID, or joint correlation calculated by luma and chroma samples.

In the above embodiment, the binary function $$f_j(x, y) = (\text{some conditions})\ ?\ 1:0$$

can be replaced with $$f_j(x, y) = (\text{some conditions})\ ?\ C:0,$$

where C is a magnitude selected based on clipping index. For example, C=clipValue>>1, the magnitude of the function is varied with clipping index selection.

Figure 1B:
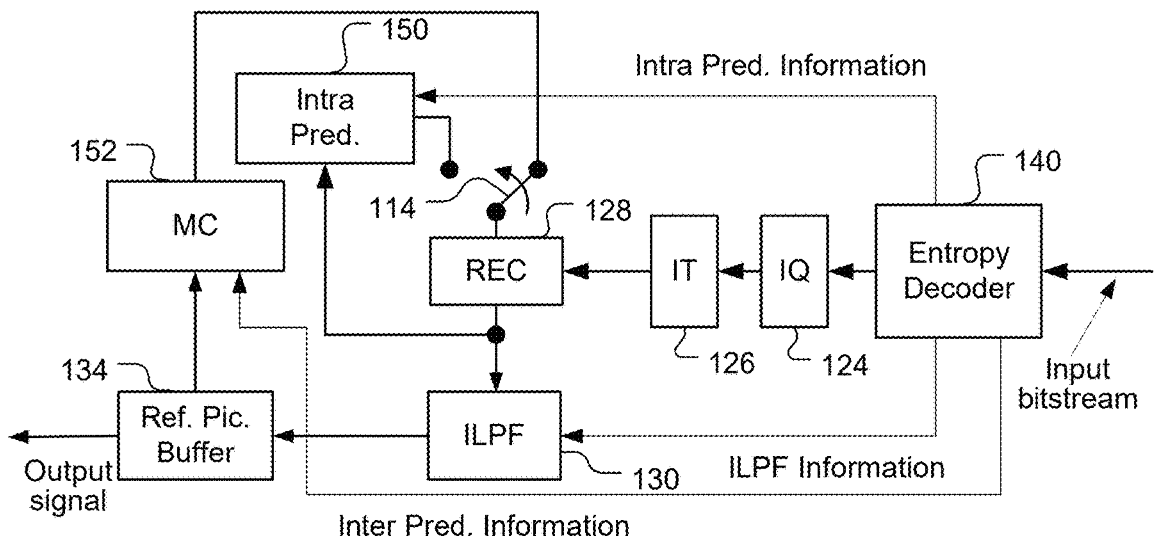
FIG. 1B illustrates a corresponding decoder for the encoder in FIG. 1A.
Figures 3C, 3D, 4A:
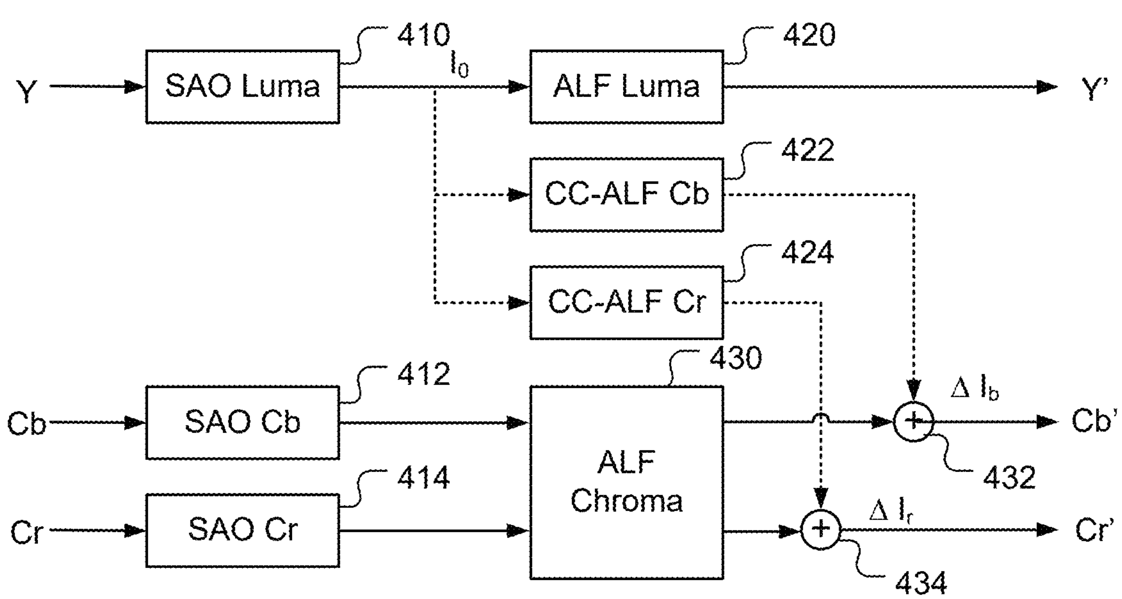
Figure 4B:
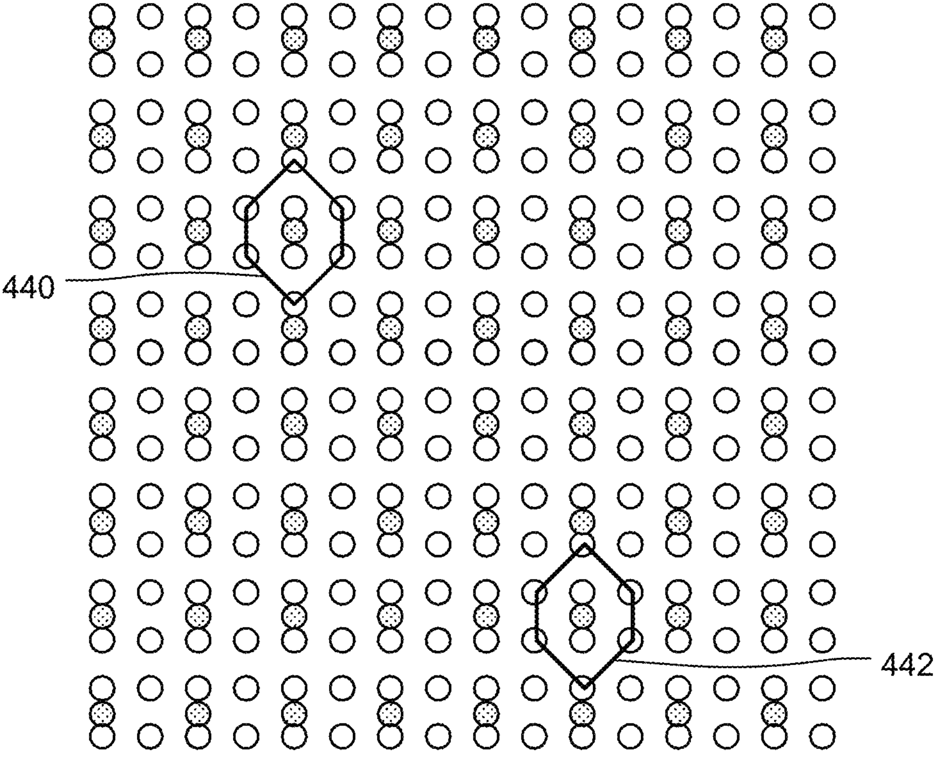
FIG. 4B illustrates a diamond shaped filter for the chroma samples.

Any of the ALF with non-sample taps methods described above can be implemented in encoders and/or decoders. For example, any of the proposed methods can be implemented in the in-loop filter module (e.g. ILPF 130 in FIG. 1A and FIG. 1B) of an encoder or a decoder. Alternatively, any of the proposed methods can be implemented as a circuit coupled to the inter coding module of an encoder and/or motion compensation module, a merge candidate derivation module of the decoder. The ALF methods may also be implemented using executable software or firmware codes stored on a media, such as hard disk or flash memory, for a CPU (Central Processing Unit) or programmable devices (e.g. DSP (Digital Signal Processor) or FPGA (Field Programmable Gate Array)).

Figure 6:
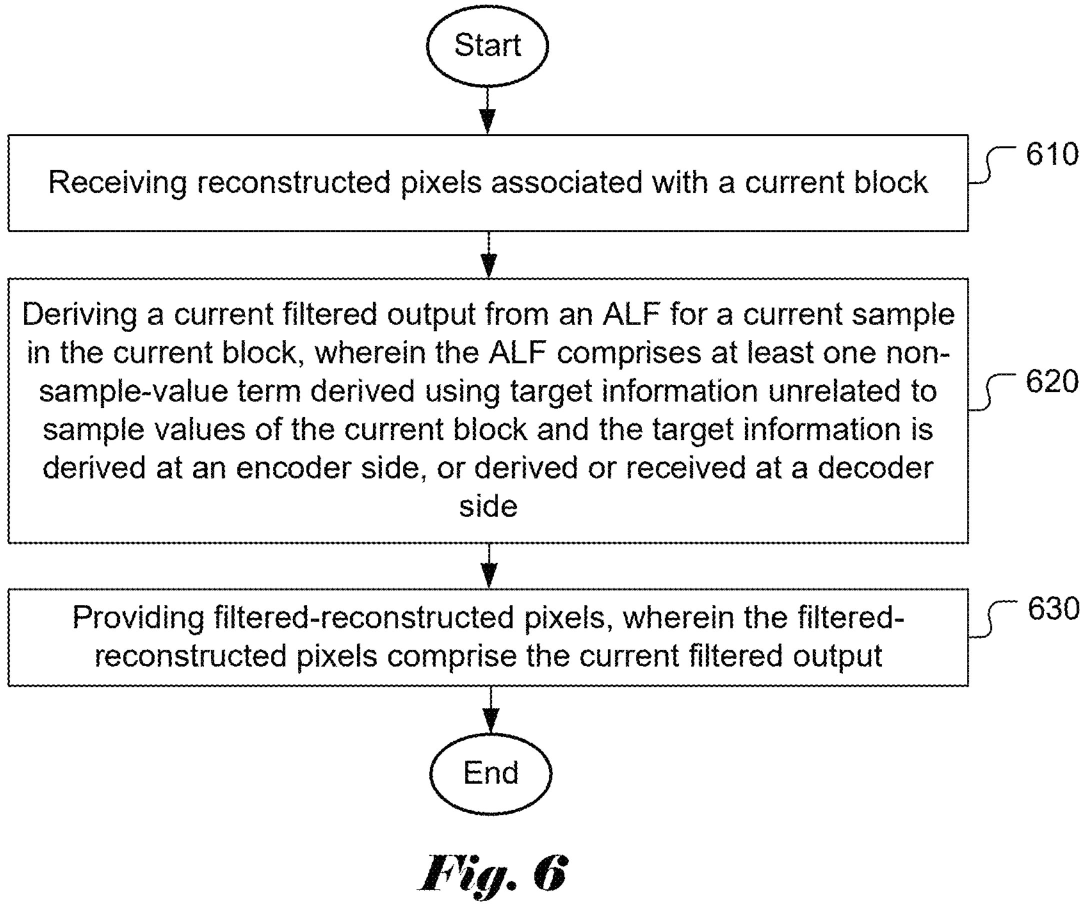
FIG. 6 illustrates a flowchart of an exemplary video coding system that utilizes ALF with non-sample-value filter taps according to an embodiment of the present invention.

FIG. 6 illustrates a flowchart of an exemplary video coding system that utilizes ALF with non-sample-value filter taps according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, reconstructed pixels associated with a current block are received in step 610. A current filtered output from an ALF for a current sample in the current block is determined in step 620, wherein the ALF comprises at least one non-sample-value term derived using target information unrelated to sample values of the current block and the target information is derived at an encoder side, or derived or received at a decoder side. The filtered-reconstructed pixels are provided in step 630, wherein the filtered-reconstructed pixels comprise the current filtered output.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for Adaptive Loop Filter (ALF) processing of reconstructed video, the method comprising:

receiving reconstructed pixels associated with a current block;

deriving a current filtered output from an ALF for a current sample in the current block, wherein the ALF comprises at least one non-sample-value term derived using target information unrelated to sample values of the current block and the target information is derived at an encoder side, or derived or received at a decoder side; and providing filtered-reconstructed pixels, wherein the filtered-reconstructed pixels comprise the current filtered output.

2. The method of claim 1, wherein said at least one non-sample-value term based on the target information is derived as a sum of one or more non-sample-value filter taps unrelated to sample values of the current block.

3. The method of claim 2, wherein each of said one or more non-sample-value filter taps corresponds to a target function of the target information.

4. The method of claim 3, wherein the target function corresponds to a positional function taking positional information of one or more current samples of the current block as an input.

5. The method of claim 4, wherein the positional function corresponds to a periodical function of one or more positions associated with one or more current samples.

6. The method of claim 3, wherein the target function corresponds to a binary function of the target information, wherein the binary function outputs a first value if the target information satisfies a condition and the binary function outputs a second value if the target information does not satisfy the condition.

7. The method of claim 6, wherein the first value corresponds to a pre-defined offset or the first value is selected according to a clipped value index associated with the current block, and the second value corresponds to 0.

8. The method of claim 6, wherein the target information corresponds to positional information of one or more current samples of the current block as an input.

9. The method of claim 8, wherein the condition is determined according to a position or one or more derivative positions for a target sample with respect to a repetitive pattern in a horizontal direction, vertical direction or both.

10. The method of claim 6, wherein the target information corresponds to CU-coded information and the CU-coded information comprises CU mode, prediction mode, CU boundary, CU residual, MV information, or a combination thereof.

11. The method of claim 10, wherein the condition is determined by comparing a horizontal component, a vertical component or both of a motion vector of the current block with one or more thresholds.

12. The method of claim 10, wherein the condition is determined based on proximity of a target sample with respect to a boundary of the current block.

13. The method of claim 10, wherein the condition is determined based on prediction direction of a target sample of the current block.

14. The method of claim 6, wherein the target information corresponds to picture information.

15. The method of claim 14, wherein the picture information comprises POC (Picture Order Count), temporal ID, layer ID, or a combination thereof.

16. The method of claim 6, wherein the target information corresponds to ALF classification information and the ALF classification information comprises transpose index, activity, directionality, quantized activity, quantized directionality, or a combination thereof derived from ALF classifier.

17. The method of claim 16, wherein the condition is determined based on a transpose index of the current block.

18. The method of claim 16, wherein the condition is determined based on quantized activity of the current block.

19. The method of claim 6, wherein the target information corresponds to joint correlation calculated from luma and chroma samples.

20. An apparatus for Adaptive Loop Filter (ALF) processing of reconstructed video, the apparatus comprising one or more electronic circuits or processors arranged to:

receive reconstructed pixels associated with a current block;

derive a current filtered output from an ALF for a current sample in the current block, wherein the ALF comprises at least one non-sample-value term derived using target information unrelated to sample values of the current block and the target information is derived at an encoder side, or derived or received at a decoder side; and provide filtered-reconstructed pixels, wherein the filtered-reconstructed pixels comprise the current filtered output.

* * * * *